(12) United States Patent
Uchida

(10) Patent No.: US 9,017,591 B2
(45) Date of Patent: Apr. 28, 2015

(54) METHOD FOR MANUFACTURING SEAMLESS BELT FOR ELECTROPHOTOGRAPHY

(75) Inventor: Kouichi Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 13/449,588

(22) Filed: Apr. 18, 2012

(65) Prior Publication Data

US 2012/0274002 A1    Nov. 1, 2012

(30) Foreign Application Priority Data

Apr. 27, 2011    (JP) .................................. 2011-099447

(51) Int. Cl.
| | |
|---|---|
| *B29C 49/22* | (2006.01) |
| *B29D 29/00* | (2006.01) |
| *B29C 49/02* | (2006.01) |
| *B29L 29/00* | (2006.01) |
| *B29C 49/12* | (2006.01) |

(52) U.S. Cl.
CPC ........... *B29C 49/22* (2013.01); *B29C 2049/026* (2013.01); *G03G 2215/1623* (2013.01); *B29L 2029/00* (2013.01); *B29D 29/00* (2013.01); *B29C 49/12* (2013.01); *B29C 49/221* (2013.01); *B29C 2793/009* (2013.01)

(58) Field of Classification Search
CPC ................................................ B29C 2049/026
See application file for complete search history.

(56) References Cited

U.S. PATENT DOCUMENTS

| | | | |
|---|---|---|---|
| 2004/0071885 A1* | 4/2004 | Hutchinson et al. | 427/385.5 |
| 2006/0099363 A1* | 5/2006 | Farha | 428/35.7 |

FOREIGN PATENT DOCUMENTS

| | | |
|---|---|---|
| JP | 2010-79245 A | 4/2010 |
| JP | 2010-113128 A | 5/2010 |

OTHER PUBLICATIONS

Machine Translation of JP 2010-113128 A.*
Translation of JP 2010-113128 A, May 20, 2010.*

* cited by examiner

*Primary Examiner* — Benjamin Schiffman
(74) *Attorney, Agent, or Firm* — Fitzpatrick, Cella, Harper & Scinto

(57) ABSTRACT

A method capable of efficiently manufacturing a high-quality seamless belt for electrophotography is provided. The method is a method for manufacturing a seamless belt for electrophotography including a base layer having a thermoplastic resin composition, and a surface layer, wherein the method includes: (1) forming an energy curable coated film having a glass transition temperature on an outer surface of a test tube-shaped preform including a thermoplastic resin; then blow molding the preform to obtain a blow bottle; (2) irradiating the blow bottle with an energy ray to cure the coated film to thereby form the surface layer; and (3) cutting out a seamless belt from the blow bottle obtained in (2) and having a surface layer.

2 Claims, 1 Drawing Sheet

METHOD FOR MANUFACTURING SEAMLESS BELT FOR ELECTROPHOTOGRAPHY

BACKGROUND OF THE INVENTION

1. Field of the Invention

The present invention relates to a method for manufacturing a seamless belt for electrophotography used for an electrophotographic apparatus.

2. Description of the Related Art

Seamless belts for electrophotography can improve the durability of transfer members from the viewpoint of wear resistance by having a hard coat layer having an ultraviolet curable resin on the surface. The following methods for manufacturing such seamless belts for electrophotography are known.

That is, Japanese Patent Application Laid-Open No. 2010-113128 discloses a method in which a base material of a seamless belt for electrophotography obtained by blow molding a preform is dip coated with an ultraviolet curable acrylic resin, and thereafter, the ultraviolet curable acrylic resin is cured to thereby form a hard coat layer.

Japanese Patent Application Laid-Open No. 2010-79245 discloses a method in which a belt base material for electrophotography including a polyimide resin and a carbon black and obtained by centrifugal molding is spray coated with an ultraviolet curable acrylic urethane resin, and the ultraviolet curable acrylic urethane resin is cured to thereby form a hard coat layer.

SUMMARY OF THE INVENTION

The present inventor has made studies on the methods described in Japanese Patent Application Laid-Open No. 2010-113128 and Japanese Patent Application Laid-Open No. 2010-79245 cited above. As a result, the method described in Japanese Patent Application Laid-Open No. 2010-113128 having a dipping step needs to prepare an apparatus for immersing a seamless belt for electrophotography. The method further needs to contrive to prevent adhesion of an ultraviolet curable acrylic resin on the inner peripheral surface of the seamless belt for electrophotography.

Then, the present inventor has studied a method for efficiently manufacturing a seamless belt for electrophotography having a uniform thickness surface layer.

That is, the present inventor has studied to apply a liquid energy curable resin including a solution containing a monomer or an oligomer like a resin used in Japanese Patent Application Laid-Open No. 2010-113128 on the surface of a preform, and thereafter blow mold the coated preform. However, since the liquid energy curable resin including a solution containing a monomer or an oligomer like a resin used in Japanese Patent Application Laid-Open No. 2010-113128 maintains the liquid state on the preform surface even after the solvent has vaporized, the liquid energy curable resin adheres to a mold in blow molding in some cases, and in this case, the mold for blow molding needs to be cleaned.

Then, the present invention is directed to providing a method for efficiently manufacturing a seamless belt for electrophotography having a hard coat layer.

According to one aspect of the present invention, there is provided A method for manufacturing a seamless belt for electrophotography, the seamless belt comprising a base layer comprising a thermoplastic resin composition, and a surface layer, the method comprising the steps of: (1) forming an energy curable coated film having a glass transition temperature on an outer surface of a test tube-shaped preform comprising a thermoplastic resin, and then blow molding the preform to obtain a blow bottle; (2) irradiating the blow bottle with an energy ray to cure the coated film to thereby form the surface layer; and (3) cutting out a seamless belt from the blow bottle having the surface layer, obtained in the step (2).

The present invention can efficiently manufacture a seamless belt for electrophotography having a hard coat layer as a surface layer.

Further features of the present invention will become apparent from the following description of exemplary embodiments with reference to the attached drawings.

DESCRIPTION OF THE EMBODIMENTS

Figure 1:
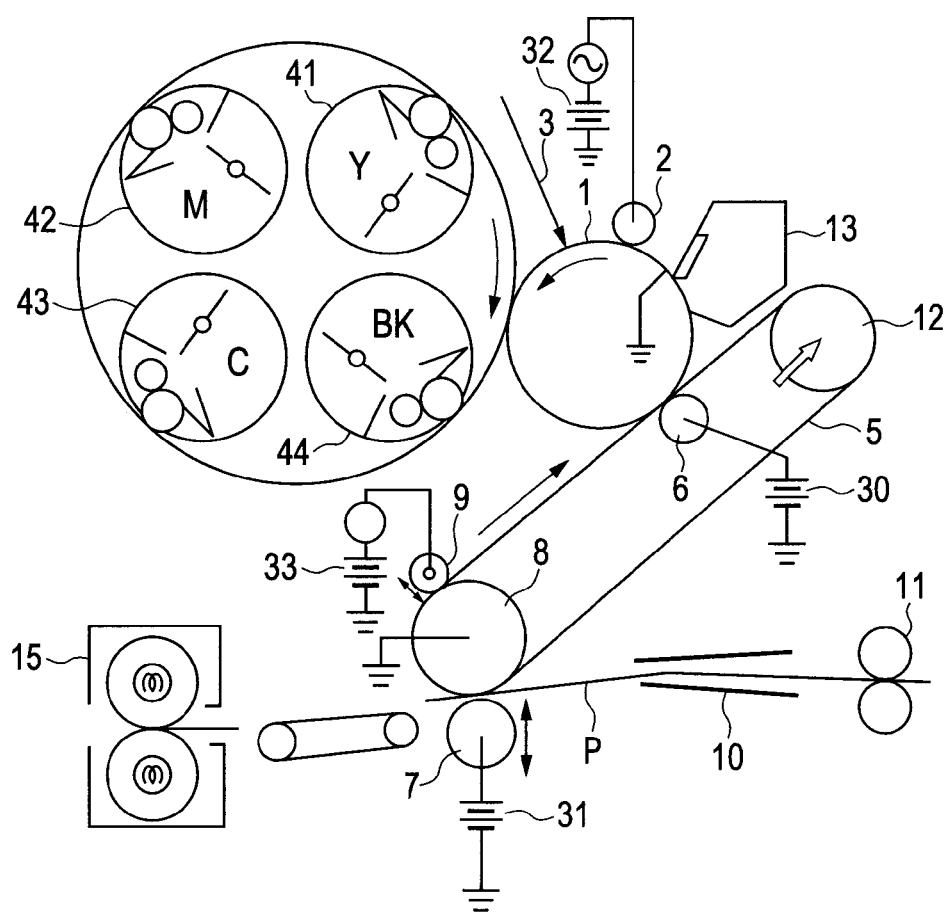
FIG. 1 is an illustrative diagram of an electrophotographic apparatus according to the present invention.

Preferred embodiments of the present invention will now be described in detail in accordance with the accompanying drawings.

Hereinafter, exemplary embodiments according to the present invention will be described in detail.

<Thermoplastic Resin Composition>

As a thermoplastic resin composition used for a base layer, any combination of materials can suitably be used as long as it allows blow molding from a test tube-shaped preform. As a thermoplastic resin as a main component, particularly all of thermoplastic resins, such as polypropylene (PP), polyethylene (PE), polyamide (PA), polylactic acid (PLLA), polyethylene terephthalate (PET), polyethylene naphthalate (PEN), polyphenylene sulfide (PPS) and fluororesins (PVdF and the like), and blended resins thereof, are suitably used. Examples of other components constituting a thermoplastic resin composition include ionic conductive agents (for example, polymer ionic conductive agents and surfactants), conductive polymers, antioxidants (for example, hindered phenolic-based, phosphorus-based and sulfur-based antioxidants), ultraviolet absorbents, organic pigments, inorganic pigments, pH regulators, crosslinking agents, compatibilizers, release agents (for example, silicone-based and fluorine-based release agents), coupling agents, lubricants, insulating fillers (for example, zinc oxide, barium sulfate, calcium sulfate, barium titanate, potassium titanate, strontium titanate, titanium oxide, magnesium oxide, magnesium hydroxide, aluminum hydroxide, talc, mica, clay, kaolin, hydrotalcite, silica, alumina, ferrite, calcium carbonate, barium carbonate, nickel carbonate, glass powder, quartz powder, glass fibers, alumina fibers, potassium titanate fibers and microparticles of thermosetting resins), conductive fillers (for example, carbon black, carbon fibers, conductive titanium oxide, conductive tin oxide and conductive mica) and ionic liquids. These may be used singly or in combinations of two or more.

<Energy Curable Coated Film>

The energy curable coated film formed on the surface of a preform according to the present invention needs to have a glass transition temperature. That is, since the energy curable coated film having a glass transition temperature progresses in resinification even in a state before being crosslinked, the coated film hardly adheres to a mold even if being contacted with the mold for blow molding.

A method for forming such a coated film on a preform surface includes a method in which a film of a coating material including a resin having a glass transition temperature and dissolved in a solvent or the like is applied on the surface of the preform, and the solvent is removed from the film.

It can be confirmed that a coated film has a glass transition temperature, for example, by observation of a peak in viscoelastic (rheological) properties of the coated film, or the presence of an inflection point in a DSC curve obtained by DSC (differential scanning calorimetry) measurement of the coated film.

Examples of energy to cure an energy curable resin include light, radiation and heat. The energy is not especially limited as long as it is an active radiation capable of imparting energy that can generate a polymerization initiation species in the energy curable resin, and broadly includes α rays, γ rays, X rays, ultraviolet rays (UV), visible light rays and electron beams. Above all, ultraviolet rays and electron beams are desirable, and ultraviolet rays are especially desirable, from the viewpoint of curing sensitivity and the easy availability of the apparatus.

An energy curable resin to be used needs to have the physical property of being capable of forming a coated film having a glass transition temperature. Whether or not the energy curable resin has a glass transition temperature can usually be determined to some degree by a molecular weight of the resin. If the molecular weight of the resin is too low, a coated film having a glass transition temperature cannot be formed; and if the molecular weight thereof is too high, the resin gelates or otherwise, does not dissolve in a solvent, which is not desirable.

An energy curable resin to be used needs to be dissolved in a solvent, and a suitable solvent can be an organic solvent from the viewpoint of volatility, and can be, for example, methyl ethyl ketone, toluene and methyl isobutyl ketone. These may be used singly or in combinations of two or more. The mass ratio of an energy curable resin and an organic solvent is not especially limited as long as a coated film is uniformly formed on a preform, but the mass ratio thereof can be 3:97 to 90:10.

An energy curable resin to be suitably used has a polymerizable functional group such as an acrylic group, a vinyl group and an epoxy group. Among energy curable resins, an ultraviolet curable acrylic resin is desirable from the viewpoint of the simplicity of a curing apparatus and the like. These may be used singly or in combinations of two or more.

A resin used for formation of the coated film according to the present invention needs to have a polymerizable functional group such as an acrylic group, a vinyl group and an epoxy group, has a solubility to a solvent which does not dissolve a preform, and has a glass transition temperature, as described above.

The coated film having a glass transition temperature according to the present invention further needs to be present as a coated film without generating cracks even on the surface of a blow bottle formed by blow molding of a preform. That is, the coated film needs to have enough flexibility to conform to extension of the preform by blow molding.

In order to impart such flexibility to the coated film, the weight-average molecular weight of a resin having a glass transition temperature used for formation of the coated film can be suitably selected.

For example, in the case where a blow bottle having an outer diameter 4.5 times the outer diameter of a preform is molded by blow molding the preform, examples of resins usable for formation of a coated film on the surface of the preform include UNIDIC RC29-129 (trade name, manufactured by DIC Corporation, weight-average molecular weight=30000) and Acrit KX-012C (trade name, manufactured by Taisei Fine Chemical Co., Ltd., weight-average molecular weight=25000).

In the case where the ratio of the outer diameter of a blow bottle to the outer diameter of a preform is made larger, the weight-average molecular weight of a resin needs to be regulated on the low side in order to impart sufficient conformability to the expansion of the preform in blow molding to the coated film, in such a limiting range that the resin has a polymerizable functional group such as an acrylic group, a vinyl group and an epoxy group, has a solubility to a solvent which does not dissolve the preform, and has a glass transition temperature.

Components constituting a coated film of an energy curable resin may have, in addition to the energy curable resin, various types of additives, and examples of such additives include polymerization initiators, ionic conductive agents (for example, polymer ionic conductive agents and surfactants), conductive polymers, antioxidants (for example, hindered phenolic-based, phosphorus-based and sulfur-based antioxidants), ultraviolet absorbents, organic pigments, inorganic pigments, pH regulators, crosslinking agents, compatibilizers, release agents (for example, silicone-based and fluorine-based release agents), coupling agents, lubricants, insulating fillers (for example, zinc oxide, barium sulfate, calcium sulfate, barium titanate, potassium titanate, strontium titanate, titanium oxide, magnesium oxide, magnesium hydroxide, aluminum hydroxide, talc, mica, clay, kaolin, hydrotalcite, silica, alumina, ferrite, calcium carbonate, barium carbonate, nickel carbonate, glass powder, quartz powder, glass fibers, alumina fibers, potassium titanate fibers and microparticles of thermosetting resins), conductive fillers (for example, carbon black, carbon fibers, conductive titanium oxide, conductive tin oxide and conductive mica) and ionic liquids. These may be used singly or in combination of two or more.

<Manufacturing Method>

The method for manufacturing a seamless belt for electrophotography according to the present invention includes three steps. That is, the method including: (1) forming an energy curable coated film having a glass transition temperature on the outer surface of a test tube-shaped preform having a thermoplastic resin, and blow molding the preform to obtain a blow bottle; (2) irradiating the blow bottle with an energy ray to cure the coated film to thereby form a surface layer; and (3) cutting out a seamless belt from the blow bottle obtained in (2) and having the surface layer.

A method for fabricating a test tube-shaped preform including a thermoplastic resin is usually a method by injection molding, and needs to give an amorphous state of a later-described biaxially stretchable degree to the preform. Such a preform can be obtained by regulating the temperature of a metal mold when being manufactured by injection molding by placing a thermoplastic resin composition in the metal mold of a preform shape. Specifically, the metal mold temperature is set at a sufficiently lower temperature than the glass transition temperature of a thermoplastic resin composition to thereby quench the thermoplastic resin composition in the metal mold. From the viewpoint of obtaining a preform in an amorphous state of a biaxially stretchable degree, the cylinder temperature of injection molding can be set to be about 20 to 50° C. higher than the melting point of the thermoplastic resin composition, and the metal mold temperature can be set to be about 20 to 100° C. lower than the glass transition temperature of the thermoplastic resin composition.

Then, a method for forming an energy curable coated film having a glass transition temperature will be described. Usually, a solution in which an energy curable resin solution is dissolved in an organic solvent or the like is applied on the outer surface of a preform by a well-known method, and thereafter left to stand in a thermostatic chamber or the like in order to vaporize the organic solvent.

Examples of a method of coating on the preform outer surface include spray coating, dipping coating and ring coating, but dipping coating is desirable from the viewpoint of simplicity.

A method for blow molding a preform having the energy curable coated film formed on the outer surface thereof will be described. Blow molding by a cold parison method is desirable from the viewpoint that a coated film is applied on a preform. The cold parison method refers to a method in which mainly a barrel wall of a preform obtained by an injection molding method is reheated, and the preform is stretched in the axial direction using a stretching rod in a blow metal mold at a temperature equal to or higher than the glass transition temperature of a thermoplastic resin composition constituting the preform and equal to or lower than the melting point thereof, and is radially stretched by blowing a gas inside the preform, to thereby obtain a blow bottle. In the method according to the present invention, since the energy curable resin is formed as a coated film, the resin causes no mold contamination due to attachment of the resin on the inner surface of the blow metal mold in blow molding.

The energy curable coated film can be formed to conform to the blow bottle obtained by the above method. The energy curable coated film can be cured by energy irradiation on the blow bottle.

A step may further be added, for example, in which in order to control the shape of the blow bottle, using a well-known method, the blow bottle is placed on an electroformed mold, heated to a temperature higher than the glass transition temperature of a thermoplastic resin composition constituting the blow bottle under the impression of a pressure of air or the like, and then returned to normal temperature and normal pressure, and taken out.

A barrel portion of the blow bottle having a surface layer obtained by the above method is cut in a predetermined width to thereby obtain the seamless belt for electrophotography according to the present invention.

The thickness of a seamless belt for electrophotography is usually 10 μm or larger and 500 μm or smaller, and especially 30 μm or larger and 150 μm or smaller. Specifically, a recommended volume specific resistivity of a seamless belt for electrophotography, in the case where the seamless belt for electrophotography is used as an intermediate transfer belt, is $1\times10^2$ Ωm or higher and $10^{14}$ Ωcm or lower.

<Electrophotographic Apparatus>

The electrophotographic apparatus according to the present invention will be described. FIG. 1 is a cross-sectional diagram of a full-color electrophotographic apparatus. In FIG. 1, the cylindrical seamless belt for electrophotography according to the present invention is used as an intermediate transfer belt 5. An electrophotographic photosensitive member 1 is a rotary drum-type electrophotographic photosensitive member (hereinafter, described as "photosensitive drum") used repeatedly as a first image carrier, and is rotationally driven at a predetermined peripheral speed (process speed) in the arrow direction. The photosensitive drum 1 is uniformly charged in predetermined polarity and potential by a first charging machine 2 in the rotation process. Then, a static latent image corresponding to a first color component image (for example, yellow color component image) of a target color image is formed by reception of an image exposure 3 by an exposure unit. The exposure unit includes a color-separation and imaging exposure optical system of a color manuscript image, and a scanning exposure system using a laser scanner outputting laser beams modulated corresponding to time-series electric digital pixel signals of image information. Then, the static latent image is developed with a yellow toner Y as a first color by a first developing machine (yellow color developing machine 41). At this time, a second to fourth developing machines (a magenta color developing machine 42, a cyan color developing machine 43, a black color developing machine 44) are all in off-operation state, and do not act on the photosensitive drum 1; and the yellow toner image of the first color is not affected by the second to fourth developing machines. The electrophotographic belt 5 is rotationally driven in the arrow direction at the same peripheral speed as the photosensitive drum 1. The yellow toner image on the photosensitive drum 1 is transferred (primary transfer) to the outer peripheral surface of the intermediate transfer belt 5 by an electric field formed by a primary transfer bias impressed from an opposing roller 6 to the electrophotographic belt 5 when the yellow toner image passes through a nip portion between the photosensitive drum 1 and the intermediate transfer belt 5. The surface of the photosensitive drum 1 which has finished the transfer of the yellow toner image of the first color to the electrophotographic belt 5 is cleaned by a cleaning apparatus 13. Similarly, a magenta toner image of a second color, a cyan toner image of a third color and a black toner image of a fourth color are sequentially superposed on the electrophotographic (intermediate transfer) belt 5 and transferred to thereby form a synthesized color toner image corresponding to the target color image. A secondary transfer roller 7 is journaled correspondingly to and parallel with a drive roller 8, and disposed separably on the lower surface part of the electrophotographic belt 5.

In the primary transfer step of the toner image of the first to third color toner images from the photosensitive drum 1 to the electrophotographic belt 5, the secondary transfer roller 7 may be separated from the electrophotographic belt 5. The transfer of the synthesized color toner image transferred on the electrophotographic belt 5 to a transfer material P being a second image carrier is carried out as follows. First, the secondary transfer roller 7 is contacted with the electrophotographic belt 5, and the transfer material P is fed in a predetermined timing from a paper feed roller 11 to a contacting nip between the electrophotographic belt 5 and the secondary transfer roller 7 through a transfer material guide 10. A secondary transfer bias is impressed to the secondary transfer roller 7 from a power source 31. The secondary transfer bias transfers (secondary transfer) the synthesized color toner image from the electrophotographic (intermediate transfer) belt 5 to the transfer material P being the second image carrier. The transfer material P having received the transfer of the toner image is introduced in a fixing machine 15, and heated for fixation. After the completion of the image transfer to the transfer material P, an intermediate transfer belt cleaning roller 9 of a cleaning apparatus is contacted with the electrophotographic belt 5, which is impressed with a bias of a reverse polarity to the photosensitive drum 1. Thereby, a toner (transfer remaining toner) which has not been transferred to the transfer material P and remains on the electrophotographic belt 5 is imparted with a charge of a reverse polarity to the photosensitive drum 1. Reference numeral 33 is a bias power source. The transfer remaining toner is electrostatically transferred to the photosensitive drum 1 in the nip portion of the photosensitive drum 1 and the vicinity thereof to thereby clean the electrophotographic belt 5.

EXAMPLES

Examples and Comparative Examples will be shown hereinafter, to specifically describe the present invention. In Examples and Comparative Examples, seamless belts for electrophotography out of electrophotographic belts were fabricated, and analyses and measurements used in Examples and Comparative Examples were carried out as follows.

(Measurement Methods and Evaluation Methods of Physical Property Values)

Measurement methods and evaluation methods of physical property values of seamless belts for electrophotography fabricated in Examples and Comparative Examples were as follows.

<Measurement of a Glass Transition Temperature of a Coated Film>

A coating material to form a coated film on the surface of a preform was applied on a plate glass, and thereafter dried in a drying oven at 70° C. for 10 min to thereby form a coated film. Then, the coated film was peeled off the plate glass, and cut out into a sample of 10 mg. A DSC curve using the sample was measured under the following condition. Then, a temperature at the center of an inflection point indicating glass transition on the DSC curve obtained was defined as a glass transition temperature. The case where no glass transition temperature was observed in the DSC curve is shown as "none" in Table 5.

Apparatus used: a differential scanning calorimeter (trade name: DSC823, manufactured by Mettler-Toledo International Inc.)
Temperature-rise rate: 10° C./min
Measurement initiation temperature: −30° C.
Measurement end temperature: 300° C.
Modulation temperature amplitude: ±1° C.
Modulation period: 15 seconds <Measurement Method of a Thickness of a Surface Layer of a Preform>

The thickness of a surface layer of a preform was determined by cutting a thickness cross-section of the preform with an ultrasonic cutter, and subtracting a thickness of the preform from a sum thickness of the preform and the surface layer by using a micrometer.

<Measurement Method of a Thickness of a Surface Layer of a Seamless Belt for Electrophotography>

The thickness of a surface layer of a seamless belt for electrophotography was calculated by cutting a thickness cross-section of the seamless belt for electrophotography with a microtome or the like, and observing the cross-section by a field-emission scanning electron microscope (FE-SEM) XL30 (trade name, manufactured by FEI Company). Thicknesses of a surface layer of a seamless belt at 6 points in total of 3 points of equal distances in the peripheral direction and 2 points of equal distances in the axial direction were measured, and an average value, i.e. 6 points=3 points×2 points, a maximum value and a minimum value were determined.

<Confirmation Method of Durability of a Seamless Belt for Electrophotography>

A seamless belt for electrophotography was installed as an intermediate transfer belt in an intermediate transfer unit of a laser beam printer (trade name: LBP-5200, manufactured by Canon Inc.) having an apparatus structure as illustrated in FIG. 1. After passing of 100,000 sheets of paper, purple solid images using two colors of cyan and magenta were printed on an A4 gloss paper of 155 g/m² under the environment of a temperature of 23° C. and a humidity of 50% RH. The images were visually observed and the presence/absence of streaks caused by the durability of the seamless belt were confirmed, and evaluated under the following standard.

A: there were no streaks and no solid concentration unevenness in outputted images.
B: there were streaks and solid concentration unevenness in outputted images.

Example 1

Fabrication of a Preform:

A thermoplastic resin composition was prepared by thermally melting and kneading by the blend described in Table 1 by using a twin-screw extruder (trade name: TEX30α, manufactured by Japan Steel Works, Ltd.).

TABLE 1

| | Material Names and Physical Properties | Blend Amount (parts by mass) |
|---|---|---|
| PET | Polyethylene terephthalate (Trade name: TR-8550, manufactured by Teijin Chemicals Ltd.) Tm (melting point): 260° C. Intrinsic viscosity: 0.50 dl/g (Temperature 25° C., o-chlorophenol 0.5-mass % solution) | 82 |
| PEEA | Trade name: Pellestat NC6321, manufactured by Sanyo Chemical Industries, Ltd. Tm (melting point): 190° C. | 16 |
| Additive 1 | Surfactant Trade name: potassium perfluorobutanesulfonate Manufactured by Mitsubishi Materials Corporation | 2.0 |
| Additive 2 | Carbon black (trade name: MA-100, manufactured by Mitsubishi Chemical Corporation | 1.0 |

The thermal melting and kneading temperature was regulated in the range of 260° C. or higher and 280° C. or lower, and the thermal melting and kneading time was set at about 3 to 5 min. A thermoplastic resin composition obtained was pelletized, and dried at a temperature of 140° C. for 6 hours. Then, the dried pelletized thermoplastic resin composition was placed in an injection molding apparatus (trade name: SE180D, manufactured by Sumitomo Heavy Industries, Ltd.). Then, the cylinder temperature was set at 295° C., and the thermoplastic resin composition was injection molded in a metal mold whose temperature was regulated at 30° C. to thereby fabricate a preform. The preform obtained had a test-tube shape having an outer diameter of 20 mm, an inner diameter of 18 mm and a length of 150 mm.

Preparation of a Coating Material for Forming a Coated Film

A coating material for forming a coated film was prepared by mixing materials described in Table 2.

TABLE 2

| | Material Names and Physical Properties | Blend Amount (parts by mass) |
|---|---|---|
| Ultraviolet Curable Resin | UNIDIC RC29-120 (manufactured by DIC Corporation) Butyl acetate/ethyl acetate = 4/1 Solid content concentration: 50% Viscosity: 8,000 (mPa·s at 25° C.) | 20 |

TABLE 2-continued

| | Material Names and Physical Properties | Blend Amount (parts by mass) |
|---|---|---|
| Organic Solvent | Molecular weight: about 30,000<br>Methyl isobutyl ketone | 79.5 |
| Initiator | Polymerization Initiator (trade name: IRUGACURE 184, manufactured by BASF SE) | 0.5 |

Formation of a Coated Film:

The preform fabricated in the above was immersed to the base vicinity thereof in a metal container filled with the coating material prepared in the above. Thereafter, the preform was pulled up at a speed of 5 cm/sec using a portable dip coater (trade name: DT-0001, manufactured by SDI Company, Ltd.). The preform was allowed to stand in a drying oven at a temperature of 70° C. for 10 min in order to vaporize the solvent. Then, the preform was taken out from the drying oven. After the temperature of the preform became normal temperature, a fragment was cut out from the preform, and the thickness of a coated film having the ultraviolet curable resin was measured and was 2 μm.

Figure 2:
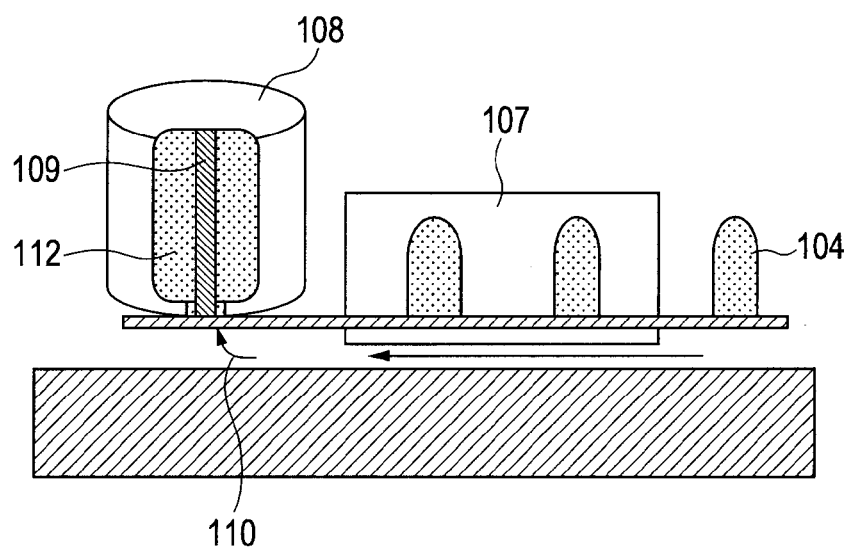
FIG. 2 is a schematic diagram of a stretch blow molding machine used in manufacture of a seamless belt for electrophotography according to the present invention.

Then, the preform 104 was disposed in a heating apparatus 107 equipped with a non-contact type heater (not illustrated) to heat the outer wall and the inner wall of the preform 104, and heated by the heater so that the temperature of the outer surface of the preform became 120° C. Then, the preform was biaxially stretched using a biaxial stretching apparatus illustrated in FIG. 2. Specifically, the heated preform 104 was disposed in a blow metal mold 108 whose temperature was kept at 30° C., and stretched in the axial direction using a stretching rod 109. Simultaneously, the preform 104 was stretched in the radial direction (4.5 times) by introducing air whose temperature was regulated at 23° C. from a blow air injection part 110 into the preform. A bottle-shaped molded product 112 biaxially stretched was thus obtained.

The bottle-shaped molded product 112 was irradiated with ultraviolet rays using an ultraviolet irradiation apparatus (trade name: UE06/81-3, manufactured by Eye Graphics Co., Ltd., cumulative light amount: 1,000 mJ/cm$^2$) under the impression of an air pressure of 0.01 MPa to thereby cure the surface layer.

Then, a barrel part of the bottle-shaped molded product 112 having the cured surface layer was cut to thereby obtain a seamless conductive belt. The thickness of the conductive belt was 70 μm. The thickness of the coated film including the ultraviolet curable resin was: the average of 6 points was 500 nm; the maximum value was 560 nm; and the minimum value was 450 nm. Evaluation results of the seamless belt are shown in Table 5.

Example 2

A seamless belt for electrophotography was obtained as in Example 1, except for using a blend ratio shown in Table 3 as an energy curable coated film. The seamless belt was evaluated as in Example 1. The evaluation results are shown in Table 5.

TABLE 3

| Material | Blend Amount (parts by mass) |
|---|---|
| Liquid ultraviolet curable acrylic polymer (Trade name: Acrit 8KX-012C, manufactured by Taisei Fine Chemical Co., Ltd.) | 50.0 |
| Solvent composition: n-propyl alcohol:butyl acetate = 1:1 (mass ratio) | |
| Viscosity: 65 mPa · s (25° C.) | |
| Molecular weight: about 25,000 | |
| Methyl isobutyl ketone | 59.5 |
| Polymerization Initiator (Trade name: IRUGACURE 184, manufactured by BASF SE) | 0.5 |

Comparative Example 1

A seamless belt for electrophotography of a base layer alone was obtained as in Example 1, except for using no energy curable coated film as an the outer surface of a preform. The seamless belt was evaluated as in Example 1. The evaluation results are shown in Table 5.

Comparative Example 2

A seamless belt for electrophotography was obtained as in Example 1, except for using a blend ratio shown in Table 4 as an energy curable coated film.

However, since due to the use of an energy curable resin having no glass transition temperature, a part of the resin adhered to the blow metal mold, the blow metal mold was contaminated and the film thickness unevenness of the surface layer of the belt became very large. The seamless belt was evaluated as in Example 1. The evaluation results are shown in Table 5.

TABLE 4

| | |
|---|---|
| A liquid ultraviolet curable acrylic polymer including dipentaerythritol hexaacrylate (trade name: OPSTAR KZ-6445, manufactured by JSR Corporation) | 60.0 |
| Solvent composition: methyl ethyl ketone:methyl isobutyl ketone = 1:1 (mass ratio) | |
| Viscosity: 5.0 mPa · s (25° C.) | |
| Molecular weight: about 1,000 | |
| Methyl isobutyl ketone | 39.5 |
| Polymerization Initiator (Trade name: IRUGACURE 184, manufactured by BASF SE) | 0.5 |

Comparative Example 3

The seamless belt obtained in Comparative Example 1 was immersed in a metal container filled with the coating liquid of an ultraviolet curable resin blended as described in Table 2, and thereafter was pulled up at a speed of 5 cm/sec using a portable dip coater (trade name: DT-0001, manufactured by SDI Company, Ltd.). The seamless belt was allowed to stand in a drying oven at a temperature of 70° C. for 10 min in order to vaporize the solvent, thereafter taken out from the drying oven, and allowed to stand to normal temperature. The seamless belt was irradiated with ultraviolet rays using an ultraviolet irradiation apparatus (trade name: UE06/81-3, manufactured by Eye Graphics Co., Ltd., cumulative light amount: 1,000 mJ/cm$^2$) to thereby cure the surface layer. The seamless belt was evaluated as in Example 1. The evaluation results are shown in Table 5.

Comparative Example 4

While the seamless belt obtained in Comparative Example 1 was suspended between two rollers, one of which was driven at 15 mm/sec, the ultraviolet curable resin solution blended as described in Table 2 was spray coated as uniformly as possible at 0.2 cc/sec using a spray gun moving reciprocally in the axis direction at 100 mm/sec. The seamless belt was allowed to stand in a drying oven at a temperature of 70° C. for 10 min in order to vaporize the solvent, thereafter taken out from the drying oven, and allowed to stand to normal temperature. The seamless belt was irradiated with ultraviolet rays using an ultraviolet irradiation apparatus (trade name: UE06/81-3, manufactured by Eye Graphics Co., Ltd., cumulative light amount: 1,000 mJ/cm$^2$) to thereby cure the surface layer. The seamless belt was evaluated as in Example 1. The evaluation results are shown in Table 5.

comparing with the seamless belts of Comparative Examples 1 to 4, were largely improved in scratchability after the durability evaluation. It is conceivable that the local film thickness unevenness of the surface layer had a deep relationship with the scratchability, and in turn affected the image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-099447, filed Apr. 27, 2011, which is hereby incorporated by reference herein in its entirety.

What is claimed is:

1. A method for manufacturing a seamless belt for electrophotography, the seamless belt comprising a base layer comprising a thermoplastic resin composition, and a surface layer, the method comprising the steps of:
   (1) forming an energy curable coated film having a glass transition temperature on an outer surface of a test tube-

TABLE 5

|  | Example 1 | Example 2 | Comparative Example 1 | Comparative Example 2 | Comparative Example 3 | Comparative Example 4 |
|---|---|---|---|---|---|---|
| Glass Transition Temperature of Energy Curable Coated Film (° C.) | 55 | 48 | — | None | 55 | 55 |
| Thickness of Surface Layer of Preform (mm) | 2.0 | 1.6 | — | — | — | — |
| Average Thickness of Surface Layer of Belt (μm) | 500 | 400 | — | 1800 | 2000 | 1600 |
| Maximum Thickness of Surface Layer of Belt (μm) (I) | 560 | 450 | — | 1900 | 2500 | 2000 |
| Minimum Thickness of Surface Layer of Belt (μm) (II) | 450 | 350 | — | 200 | 1600 | 1200 |
| (I) − (II) (μm) | 110 | 100 | — | 1700 | 900 | 800 |
| Durability of Seamless Belt | A | A | B | B | B | B |

In the case of the seamless belt of Comparative Example 3, when the belt itself was dip coated, it was difficult to control the film thickness unevenness, particularly, at both ends of the belt since the area of the belt was large, and there was a tendency that the lower part of the belt became thicker than the upper part thereof. With the aim of thinning the film thickness of the lower part of the belt, if the pulling-up speed was gradually made higher in order to uniformize the film thickness, the effect of making the speed higher made it difficult to control the film thickness unevenness in the peripheral direction, and the level of the film thickness unevenness of the surface layer of the belt could not be said to be sufficient. In the case of the seamless belt of Comparative Example 4, since in a process of reciprocation of the spray gun while spray coating, coating the same place twice could not be avoided, the level of the film thickness unevenness of the surface layer of the belt could not be said to be sufficient.

The surfaces of the seamless belts of Examples 1 and 2 and Comparative Examples 1 to 4 before and after the durability evaluation of the belts were observed by an optical microscope in 200×. The seamless belts of Examples 1 and 2, shaped preform comprising a thermoplastic resin, and then blow molding the preform to obtain a blow bottle;
   (2) irradiating the blow bottle with an energy ray to cure the coated film to thereby form the surface layer; and
   (3) cutting out a seamless belt from the blow bottle having the surface layer, obtained in the step (2),
wherein the step (1) comprises:
   forming a film of a coating material comprising an energy curable resin having a glass transition temperature dissolved in a solvent on the outer surface of the test tube-shaped preform; and
   removing the solvent from the film of the coating material to form the energy curable coated film on the outer surface of the test tube-shaped preform.

2. The method according to claim 1, wherein the energy curable resin having the glass transition temperature is an ultraviolet curable acrylic resin.

* * * * *